(12) United States Patent
Horner et al.

(10) Patent No.: US 7,008,314 B2
(45) Date of Patent: Mar. 7, 2006

(54) AIRCRAFT MODULAR CABIN PRESSURE REGULATOR

(75) Inventors: Darrell W. Horner, Oro Valley, AZ (US); Thomas J. Whitney, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 119 days.

(21) Appl. No.: 10/909,770

(22) Filed: Aug. 2, 2004

(65) Prior Publication Data

US 2006/0025064 A1    Feb. 2, 2006

(51) Int. Cl.
*B64D 13/04*    (2006.01)
(52) U.S. Cl. .............................. 454/72; 454/73; 454/74
(58) Field of Classification Search ............ 454/71–74
See application file for complete search history.

(56) References Cited

U.S. PATENT DOCUMENTS

| | | | |
|---|---|---|---|
| 2,465,759 A | 3/1949 | Sparrow | |
| 2,473,776 A * | 6/1949 | Baak .......................... | 454/74 |
| 3,141,399 A | 7/1964 | Andersen, Jr. | |
| 3,376,803 A | 4/1968 | Emmons | |
| 3,461,790 A | 8/1969 | Kinsell et al. | |
| 3,473,460 A | 10/1969 | Emmons | |
| 3,485,161 A * | 12/1969 | Kemper ....................... | 454/74 |
| 3,720,501 A * | 3/1973 | Cramer et al. .............. | 422/123 |
| 4,553,474 A | 11/1985 | Wong et al. | |
| 5,186,681 A | 2/1993 | Emmons | |
| 5,273,486 A | 12/1993 | Emmons et al. | |
| 5,297,987 A | 3/1994 | Emmons et al. | |
| 5,334,090 A | 8/1994 | Rix | |
| 5,520,578 A | 5/1996 | Bloch et al. | |
| 6,676,504 B1 | 1/2004 | Petri et al. | |

* cited by examiner

*Primary Examiner*—Harold Joyce
(74) *Attorney, Agent, or Firm*—Ingrassia Fisher & Lorenz

(57) ABSTRACT

One embodiment relates to a modular cabin pressure regulator that can receive its destination parameter and control settings from an avionics system or a manual selector and display. The modular pressure regulator includes a removable selector, a controller, and a monitoring unit to control an electro-mechanical actuator driven valve. Such modular design allows a single unit to be used for the cabin pressure selector and display, controller, and monitoring functions. In one embodiment, the selector module can be bypassed or removed and the same pressure regulator design can provide the controller and monitoring functions to send and receive inputs from an avionics system. This embodiment can be mounted directly on the electro-mechanical actuator driven valve or elsewhere on the aircraft.

20 Claims, 3 Drawing Sheets

AIRCRAFT MODULAR CABIN PRESSURE REGULATOR

FIELD OF THE INVENTION

Various embodiments of the invention pertain to aircraft cabin pressure control systems. More particularly, one embodiment of the invention pertains to a modular cabin pressure regulator, which can be configured to operate with a manual pressure selector and display or an integrated avionics selector and display.

DESCRIPTION OF RELATED ART

As integrated avionic systems become more widely employed in aircraft, traditional cabin pressure selector and display panels are removed from flight deck designs. However, it is sometimes desirable to have cabin pressure selectors and displays in the flight deck design, either because of tradition or because of a decision to segregate the cabin pressure functions from the avionics functions. As a result, two distinct cabin control pressure systems are typically designed, one system to integrate with the avionics with no selector/display and another system that includes a selector and display. If a cabin pressure control system is optimized not to include a selector/display unit, then adding a selector/display unit increases the number of parts that are necessary and costs.

SUMMARY OF THE INVENTION

One embodiment of the invention relates to a modular cabin pressure regulator that can receive its destination parameter and control settings from an avionics system or a manual selector. Destination parameters might include, but are not limited to, landing field elevation, target cabin altitude, and/or target aircraft altitude. Control settings might include the means to enter the desired cabin pressure rate of change limit, selecting between automatic control modes, or pilot entered targets control mode, or fully manual control modes. A display is employed to indicate the status or result of the selected or controlled parameters. Other aircraft systems, including avionics, are utilized to provide inputs such as the aircraft's pressure altitude, pressure altitude rate of change, barometric correction, ground/flight status, takeoff/normal status, and other inputs. The pressure regulator includes a selector and display unit, a controller, and a monitor unit. Such modular design allows a single unit to be used for the cabin pressure selector, controller, and monitoring functions. In one embodiment of the invention, the selector/display module can be bypassed or removed and the same pressure regulator design can provide the controller and monitoring functions to, and receive "selector" inputs from, an avionics system instead.

One embodiment of the invention provides an aircraft cabin pressure regulator including a processor configured to adjust cabin pressure. The pressure regulator may also include a manual pressure selector and display to provide/input destination parameters and control settings, the manual pressure selector communicatively coupled to the processor. An interface bus may be communicatively coupled to the processor and an avionics control system. A pressure sensor serves to measure the actual cabin pressure and is communicatively coupled to the processor to provide the cabin pressure to the processor. An electro-mechanical actuator driven valve operates to increase and decrease the cabin pressure as necessary. If the avionics control system is coupled to the interface bus then the processor is configured to receive a first destination parameter setting, otherwise the processor receives the first destination parameter setting from the manual pressure selector. The processor then computes the desired cabin pressure from the input destination parameter. The desired cabin pressure may be limited by other constraints derived from the aircraft pressure, altitude, fuselage stress limitations, and factors relating to cabin occupant comfort. The processor then computes a commanded cabin pressure and updates this value continuously during operation, including during flight and when the aircraft is grounded. The processor then compares the commanded cabin pressure to the actual cabin pressure and determines if there is a difference between the commanded pressure and the actual cabin pressure. The processor then adjusts the electro-mechanical actuator driven valve to reduce the difference between the commanded pressure and the actual cabin pressure. A display unit may be communicatively coupled to the processor and the processor configured to detect error conditions and display the error conditions on the display unit. This display may also be used to indicate the pilot-selected settings and controls communicated to the processor. The processor may also be configured to adjust the electro-mechanical actuator driven valve only if the difference between the commanded pressure and the actual cabin pressure setting is greater than a threshold amount.

DETAILED DESCRIPTION

Devices and apparatus that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

In the following description, certain terminology is used to describe certain features of one or more embodiments of the invention. For instance, "aircraft" includes, but is not limited to, airplanes, blimps, and other air-borne vehicles and/or apparatus. As used herein, the term "pressure altitude" refers to a measured pressure which is converted to an equivalent altitude based on an industry standard conversion table called the "U.S. Standard Atmosphere". This standard conversion table provides the pressure at increasing altitudes for a standard day in which the sea level pressure is 29.921 inches of mercury and the temperature is 59 degrees Fahrenheit.

One embodiment of the invention provides a modular cabin pressure selector panel, controller, and monitoring unit. Such modular design allows a single unit to be used for the cabin pressure selector, controller, and monitoring functions, or the selector module can be removed and the same design can provide the controller and monitoring functions to, and receive inputs from, the avionics system.

Figure 1:
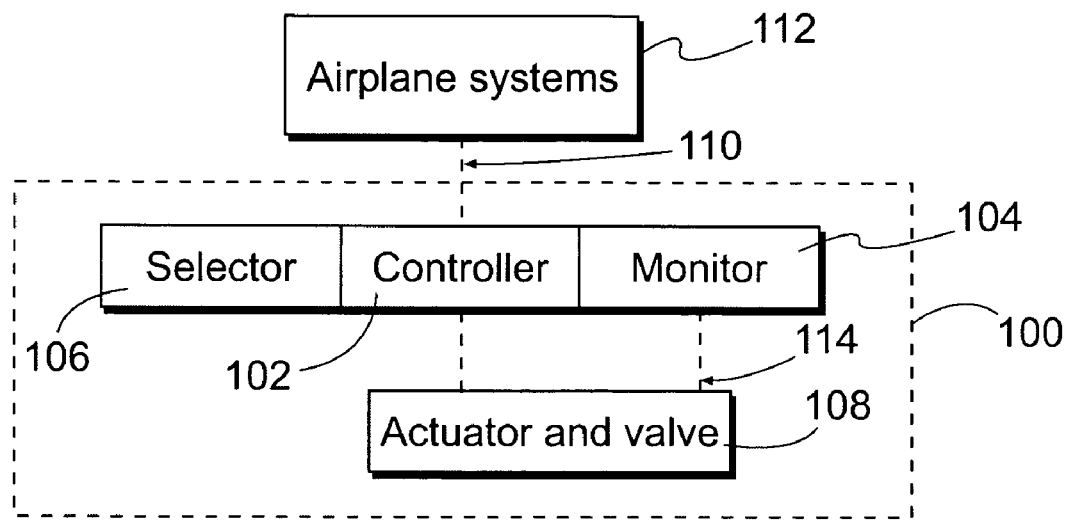
FIG. 1 is a block diagram illustrating a cabin pressure regulator in a manual selection configuration according to one embodiment of the invention.

FIG. 1 is a block diagram illustrating a cabin pressure regulator 100 in a manual pressure selection configuration according to one embodiment of the invention. The cabin pressure regulator 100 includes a controller or processing unit 102, a monitoring unit 104, a selector and display unit 106 and an electro-mechanical actuator driven valve 108. In a first mode of operation, the controller 102 may include a cabin pressure sensor to measure cabin pressure and provide a corresponding signal to the controller processor within the controller 102. The selector 106 permits a user to manually select one or more desired destination parameters and/or control inputs and provides one or more corresponding signals to the controller 102. The controller 102 also receives inputs from an aircraft avionics system 112 and a digital communication data bus 110 for inputs, such as aircraft pressure altitude, aircraft pressure altitude rate of change, barometric correction, flight/ground status, and takeoff/normal status. These signals may be communicated via the digital communication data bus 110 and or via discrete inputs. The controller 102 processes the signals from the selector and display unit 106, the digital communication data bus 110, and the cabin pressure sensor (inside controller 102) to obtain the commanded cabin pressure and the actual cabin pressure and determines if they indicate a pressure differential. If the difference between the commanded cabin pressure and the measured cabin pressure is greater than a threshold amount, then the controller 102 adjusts the electro-mechanical actuator driven valve 108 to increase or decrease the cabin pressure as needed. The controller 102 adjusts the electro-mechanical actuator driven valve 108 continuously or periodically to achieve the desired cabin pressure.

In various embodiments of the invention, the components described above may have a different arrangement without deviating from the novelty of the invention. For example, the cabin pressure sensor may be a separate independent component from the controller 102 that communicates pressure information to the controller 102.

Figure 2:
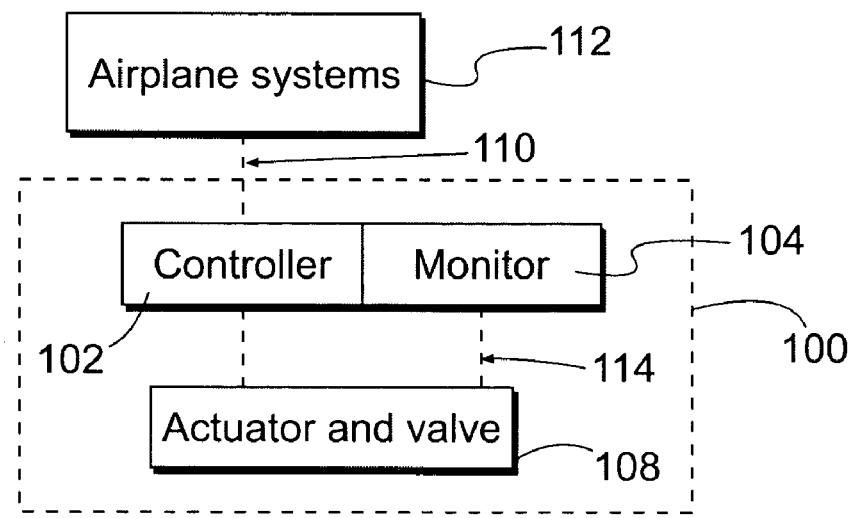
FIG. 2 is a block diagram illustrating the cabin pressure regulator in FIG. 1 in an ic pressure selection configuration according to one embodiment of the invention.

FIG. 2 is a block diagram illustrating the cabin pressure regulator 100 in FIG. 1 in an automatic selection configuration according to one embodiment of the invention. In a second mode of operation, the controller 102, the monitor 104, and the electro-mechanical actuator driven valve 108 are part of the cabin pressure regulator 100. However, the manual selector 106 has been replaced as the means for selecting the desired destination parameters and controls. Instead, the digital communications data bus 110 is used to communicatively couple the cabin pressure regulator 100 to the avionic system 112 and provide one or more of the inputs previously provided by the selector 106. The avionic system 112 may be a computer system for controlling and/or monitoring the operation of an aircraft. In this second mode of operation, the avionic system 112 provides the controller 102 with the desired cabin pressure destination parameters and controls. In addition, the avionic system 112 may also provide the controller 102 with other inputs such as aircraft pressure altitude, aircraft pressure altitude rate of change, barometric correction, flight/ground status, and takeoff/normal status. The controller 102 then computes the desired and commanded cabin pressure from these avionics inputs. The controller 102 then compares the commanded cabin pressure and the measured cabin pressure and adjusts the electro-mechanical actuator driven valve 108 to increase or decrease the cabin pressure as needed.

According to one embodiment of the invention, the monitor 104 may also include a pressure sensor. This pressure sensor may be used to provide an output to the aircraft for display and monitoring of the actual cabin pressure, cabin pressure rate of change, and cabin-to-ambient differential pressure (when computed with the aircraft pressure altitude). This signal can also be used to create a high cabin altitude warning and/or deploy oxygen. The monitor's pressure sensor output signal is formatted as an analog signal and/or as a digital data bus communication signal. The monitor 104 pressure sensor can also be used in a comparison circuit to monitor whether the cabin pressure altitude has exceeded a threshold value. If the cabin pressure altitude has exceeded the threshold value, a monitor signal can be communicated to the controller 102 to disable the automatic control of the electro-mechanical actuator driven valve 108 by the controller 102. At the same time, if the cabin pressure altitude has exceeded the threshold value, the monitor 104 can command the electro-mechanical actuator driven valve 108 via a signal 114 to close the valve 108 until the cabin pressure altitude no longer exceeds the threshold value. Thus, the monitor 104 provides an altitude limit function by disabling the controller 102 from opening the valve 108, and by closing the valve 108 on its own until the altitude limit condition no longer exists.

According to one embodiment of the invention, the configurations illustrated in FIGS. 1 and 2 are two modes of operation that can be achieved with the same cabin pressure controller 102 and monitor 104. In a first mode of operation, when the cabin pressure regulator 100 is not communicatively coupled to the avionic system 112 (FIG. 1) so as not to receive the selected destination and control parameters and transmit indications, fault codes, and error indicators, etc., the controller 102 receives its selected cabin pressure destination and control parameters from the manual selector/display 106 and displays the fault codes and error indications on the selector/display 102. In this first mode of operation, the controller 102 may still receive data from the avionics system 112 such as, but not limited to, aircraft pressure altitude, aircraft pressure altitude rate of change, barometric correction, ground/flight status, and takeoff/normal status. In this first mode of operation, the cabin pressure regulator 100 may be located at the flight crew station to provide the flight crew an interface to the selector/display 106 functions.

In a second mode of operation, the manual selector 106 is removed, turned off, or otherwise bypassed, and the controller 102 in the cabin pressure regulator 100 may be configured to receive the cabin pressure destination and control parameters from the avionic system 112. If it is communicatively coupled to the avionic system 112, then the controller 102 communicates with the avionic system 112 and provides feedback information to it (e.g., measured cabin pressure, rate, differential pressure, fault codes, error indicators, etc.), as necessary. Thus, the cabin pressure regulator 100, containing the selector/display assembly 106, the controller 102, and the monitor 104 can have a dual use for the two operating modes, but in the first mode described above, the selector/display assembly 106 has no function.

In other embodiments of the invention, the cabin pressure regulator may have a modular construction whereby a manual cabin pressure selector and/or display module 106 can be removed from the rest of the assembly to operate only in the second mode (FIG. 2). Then, the controller 102 and the monitor 104 portions of the cabin pressure regulator 100 may be located elsewhere on the aircraft.

One possible alternate location for the cabin pressure regulator 100 may be to couple it to the electro-mechanical actuator driven valve 108. Thus, the cabin pressure controller 102, the cabin pressure monitor 104, and the cabin pressure valve 108 comprise a single-unit integrated cabin pressure control and monitoring valve. Otherwise, the cabin pressure regulator 100 may be separate components located at various locations on the aircraft.

When communicatively coupled to the avionic system 112, the controller 102 may be configured to provide the measured cabin pressure, cabin pressure altitude, cabin pressure altitude rate of change, differential pressure, mode of operation, warnings, oxygen deploy, fault codes, and error indicators to the avionic system 112. The controller 102 may be configured to communicate via analog, discrete, and/or digital signals with the avionic system 112 and other components.

According to one embodiment of the invention, the controller 102 may be configured to determine when a malfunction has occurred or when it is unable to provide or maintain the desired cabin pressure and provide one or more error codes. These error codes may be displayed in a display system and/or provided to the avionic system 112. In one embodiment of the invention, the pressure regulator may include one or more displays (e.g., LED or display screen) on the selector and display unit 106 where error codes may be displayed.

According to various embodiments of the invention, the manual cabin pressure selector and display unit 106 may include conventional selector components, such as a turn knob, up/down buttons, toggle switch, and/or slide bar selector.

Figure 3:
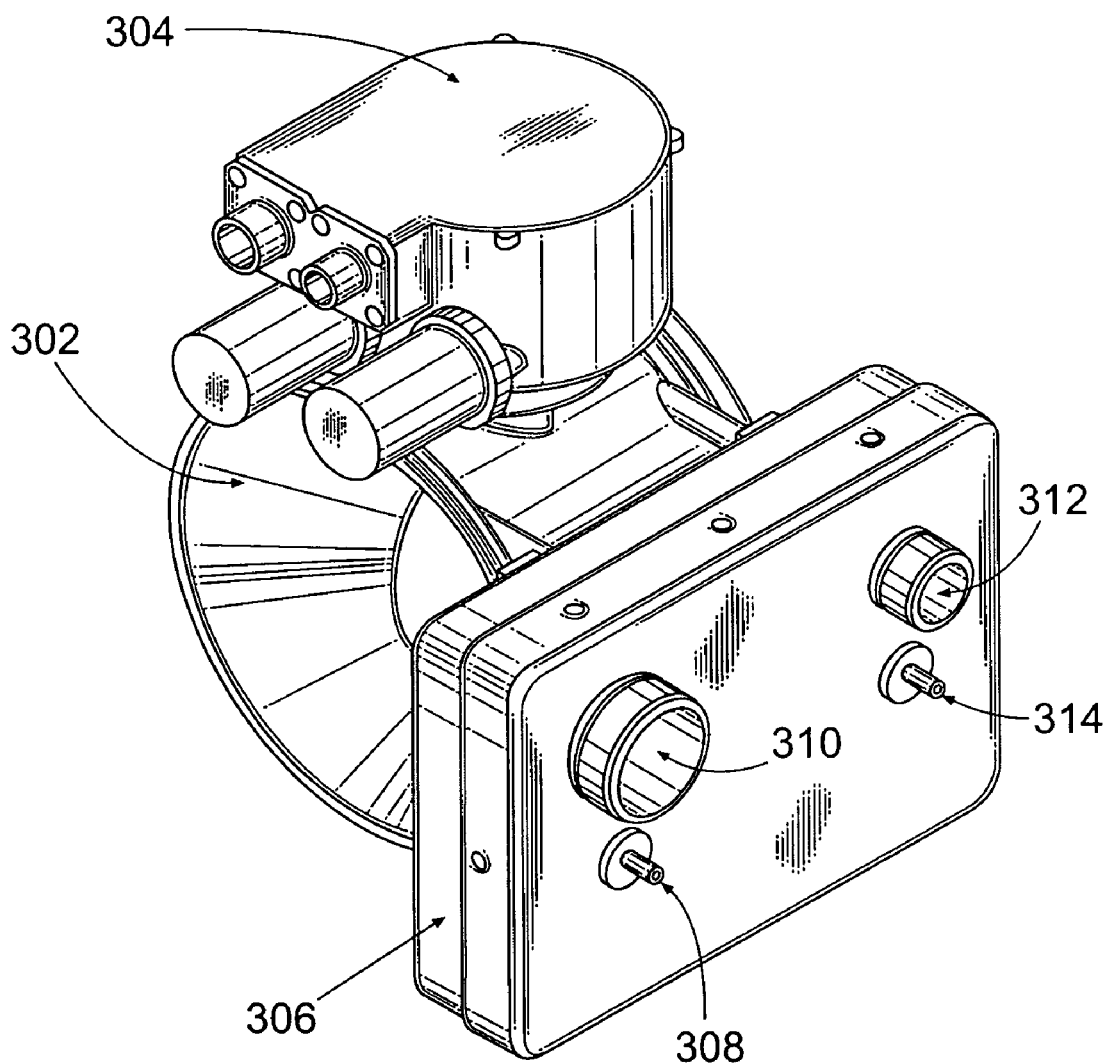
FIG. 3 illustrates an exemplary cabin pressure regulator according to one ment of the invention.

FIG. 3 illustrates an exemplary cabin pressure regulator 300 according to one embodiment of the invention. A valve 302, which is driven by an electro-mechanical actuator 304, allows air to be ducted in and out of the cabin as necessary. A module 306 containing the controller 102 and the monitor 104. The controller 102 contains a pressure sensor, pressure sensor port 308, and interface electrical connector 310 coupled to the electro-mechanical actuator 304 to control the operation of the valve 302. The electrical connector 310 may also be coupled to the avionics system 112 via electrical wiring and interface bus 110. The controller 102 receives the desired cabin pressure destination parameters and control inputs from the avionic system 112 and computes the commanded cabin pressure. The commanded cabin pressure is compared to the measured cabin pressure from the pressure sensor, and the electro-mechanical actuator 304 and valve 302 are adjusted as necessary to maintain the cabin pressure at the desired commanded cabin pressure. The cabin pressure regulator 100 also contains the monitor 104. The monitor 104 contains a pressure sensor, pressure sensor port 314, and interface electrical connector 312 that may be coupled to the electro-mechanical actuator 304 to control the operation of the valve 302. The electrical connector 312 is also coupled to the manual control panel (not shown) of the flight crew work station for manual motor/valve control and dump control that is independent of the automatic control.

The monitor function has no effect on the manual or dump control under most circumstances. Or, the monitor 104 function conditions the manual/dump signals to a format that allows the electro-mechanical actuator 304 to operate to a given performance specification. The monitor 104 function also provides independent outputs, based upon the pressure sensor, to the avionics 112 via the interface bus 110 using analog, discrete, or digital communications bus. Additionally, the monitor function utilizes the pressure sensor to perform the altitude limit detection function and controls. The monitor 104 pressure sensor is used in a comparison circuit to monitor whether the cabin pressure altitude has exceeded a threshold value. If the cabin pressure altitude has exceeded the threshold value, a monitor 104 signal can be communicated to the controller 102 to disable the automatic control of the electro-mechanical actuator driven valve 108 (304 and 302) by the controller 102. At the same time, if the cabin pressure altitude has exceeded the threshold value, the monitor 104 can command the electro-mechanical actuator driven valve 108 (304 and 302) via a signal 114 in the closed direction until the cabin pressure altitude no longer exceeds the threshold value. Thus, the monitor 104, provides an altitude limit function by disabling the controller 102 from opening the valve 108 (302 and 304), and by closing the valve 108 (302 and 304) on its own until the altitude limit condition no longer exists.

Figure 4:
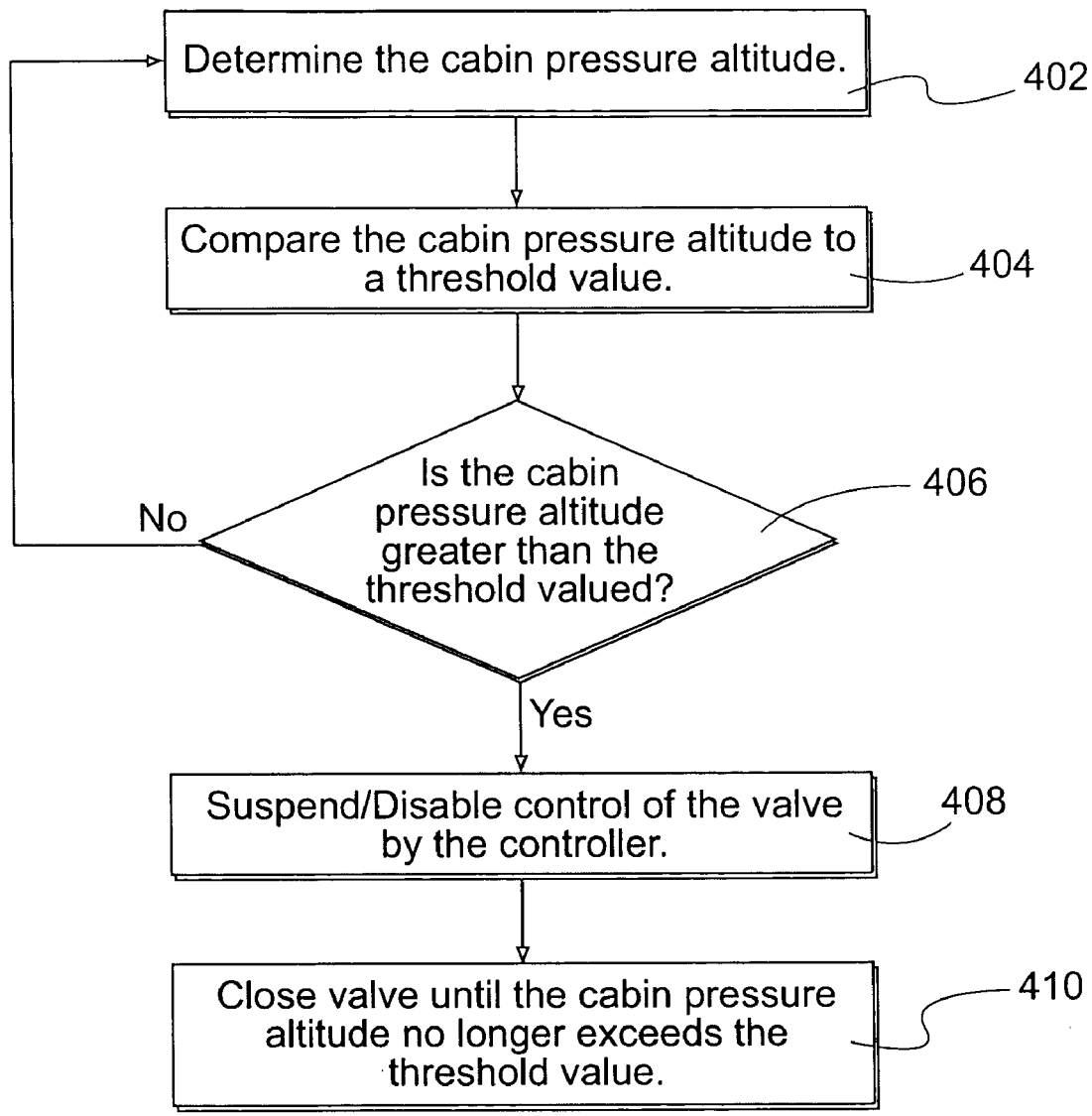
FIG. 4 is a flow diagram illustrating a monitoring feature of the cabin pressure or according to one embodiment of the invention.

FIG. 4 is a flow diagram illustrating a monitoring feature of the cabin pressure regulator according to one embodiment of the invention. A monitoring unit may be communicatively coupled to the modular manual selector and display unit 106 and/or controller 102. The monitoring unit may determine or obtain a cabin pressure altitude 402 and a threshold maximum cabin pressure altitude 404. The monitoring unit may include a pressure sensor and/or a comparison circuit to monitor whether the cabin pressure altitude has exceeded the threshold value 406. If the cabin pressure altitude has exceeded the threshold value, a signal is communicated to the controller to disable control of the valve by the controller 408 and the monitoring unit causes the valve to close until the cabin pressure altitude no longer exceeds the threshold value 410.

While certain exemplary embodiments have been described and shown in the accompanying drawings, it is to be understood that such embodiments are merely illustrative of, and not restrictive on the broad invention, and that this invention not be limited to the specific constructions and arrangements shown and described, since various other changes, combinations, omissions, modifications and substitutions, in addition to those set forth in the above paragraphs, are possible. While one or more of the exemplary embodiments described herein are employed as aircraft cabin pressure regulators, the invention is not limited to aircraft or avionic applications and may be employed in various other systems. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:
1. A pressure regulator comprising:
   a controller to control the operation of an electro-mechanical valve;
   a modular manual selector and display unit communicatively coupled to the controller, the manual selector and display unit to provide destination parameter settings and control inputs to the controller; and an interface bus communicatively coupled to the controller, wherein, if the controller senses signals over the interface bus, it is configured to receive a first destination parameter and control input settings via the interface bus, otherwise, the controller receives the first destination parameter and control input settings from the modular manual selector and display unit.

2. The pressure regulator of claim 1 wherein the modular manual selector and display unit may be removed from the pressure regulator if the controller is configured to receive a first destination parameter and control input settings via the interface bus.

3. The pressure regulator of claim 1 further comprising:
a pressure sensor communicatively coupled to the controller and to provide a measured cabin pressure to the controller.

4. The pressure regulator of claim 1 wherein the interface bus and the controller are configured to communicate with an avionic control system.

5. The pressure regulator of claim 1 wherein the controller is configured to detect error conditions and generate an error signal.

6. The pressure regulator of claim 1 further comprising:
an electro-mechanical valve communicatively coupled to the controller, the controller configured to
receive the first destination parameter and control settings,
compute a corresponding commanded cabin pressure, and
compare the commanded cabin pressure to a measured cabin pressure,
determine if there is a difference between the commanded cabin pressure and the measured cabin pressure, and
adjust the electro-mechanical valve to reduce the difference between the commanded cabin pressure and the measured cabin pressure.

7. The pressure regulator of claim 6 wherein the controller adjusts the electro-mechanical valve only if the difference between the commanded cabin pressure and the measured pressure setting is greater than a threshold amount.

8. The pressure regulator of claim 1 wherein the controller is configured to detect error conditions and display the error conditions in the display unit.

9. The pressure regulator of claim 1 further comprising:
a monitoring unit communicatively coupled to the modular manual selector and display unit, the monitoring unit including a pressure sensor and a comparison circuit to monitor whether the cabin pressure altitude has exceeded a threshold value.

10. The pressure regulator of claim 9 wherein if the cabin pressure altitude has exceeded the threshold value, a signal is communicated to the controller to disable control of the electro-mechanical valve by the controller.

11. The pressure regulator of claim 9 wherein if the cabin pressure altitude has exceeded the threshold value, the monitor causes the electro-mechanical valve to close until the cabin pressure altitude no longer exceeds the threshold value.

12. An aircraft cabin pressure regulator comprising:
a processor configured to adjust cabin pressure;
a manual pressure selector and display communicatively coupled to the processor, the pressure selector and display to provide destination parameters and control settings to the processor;
an interface bus to communicatively couple the processor and an avionics control system;
a pressure sensor to measure actual cabin pressure, the pressure sensor communicatively coupled to the processor to provide the cabin pressure to the processor; and
wherein, if an avionics control system is coupled to the interface bus, the processor receives a first destination parameter and control setting via the interface bus, otherwise, the processor receives the destination parameter and control setting from the manual pressure selector.

13. The aircraft cabin pressure regulator of claim 12 further comprising:
a display unit communicatively coupled to the processor, the processor configured to detect error conditions and display the error conditions on the display unit.

14. The aircraft cabin pressure regulator of claim 12 further comprising:
an electro-mechanical valve communicatively coupled to the processor to increase and decrease the cabin pressure as necessary, wherein the processor is configured to compare the commanded cabin pressure to the cabin pressure, determine if there is a difference between the commanded cabin pressure and the cabin pressure, and adjust the electro-mechanical valve to reduce the difference between the commanded cabin pressure and the cabin pressure.

15. The aircraft cabin pressure regulator of claim 13 wherein the processor adjusts the electro-mechanical valve only if the difference between the commanded cabin pressure and cabin pressure setting is greater than a threshold amount.

16. The aircraft cabin pressure regulator of claim 13 further comprising:
a monitoring unit communicatively coupled to the processor, the monitoring unit including a pressure sensor and a comparison circuit to monitor whether the cabin pressure altitude has exceeded a threshold value.

17. The pressure regulator of claim 16 wherein if the cabin pressure altitude has exceeded the threshold value,
a signal is communicated to the processor to disable control of the electro-mechanical valve by the controller, and
the monitoring unit causes the electro-mechanical valve to close until the cabin pressure altitude no longer exceeds the threshold value.

18. An aircraft cabin pressure regulator comprising:
a processor configured to adjust cabin pressure;
a manual pressure selector to provide a destination parameters and control settings, the manual pressure selector communicatively coupled to the processor;
an interface bus to communicatively couple the processor and an avionics control system;
a pressure sensor to measure actual cabin pressure, the pressure sensor communicatively coupled to the processor to provide the cabin pressure to the processor;
an electro-mechanical actuator driven valve to increase and decrease the cabin pressure as necessary, the electro-mechanical actuator driven valve communicatively coupled to the processor, wherein the processor is configured to
receive a first destination parameter and control settings if avionics control system is coupled to the interface bus, otherwise receive the first destination parameter and control settings from the manual pressure selector, and computes the commanded cabin pressure, and compare the commanded cabin pressure to the actual cabin pressure, determine if there is a difference between the commanded cabin pressure and the actual cabin pressure, and adjust the electro-mechanical actuator driven valve to reduce the difference between the commanded cabin pressure and the actual cabin pressure; and a display unit communicatively coupled to the processor, the processor configured to detect error conditions and display the error conditions in the display unit.

19. The aircraft cabin pressure regulator of claim 18 wherein the processor adjusts the electro-mechanical actuator driven valve only if the difference between the commanded cabin pressure and the actual cabin pressure setting is greater than a threshold amount.

20. The aircraft cabin pressure regulator of claim 18 further comprising:

a monitoring unit communicatively coupled to the processor, the monitoring unit including a pressure sensor and a comparison circuit to monitor whether the cabin pressure altitude has exceeded a threshold value, and if the cabin pressure altitude has exceeded the threshold value, a signal is communicated to the processor to disable control of the electro-mechanical actuator driven valve by the controller, and the monitoring unit causes the electro-mechanical actuator driven valve to close until the cabin pressure altitude no longer exceeds the threshold value.

* * * * *